United States Patent [19]
Pinten et al.

[11] 3,888,948
[45] June 10, 1975

[54] POLYVINYL CHLORIDE TYPE RESINS

[75] Inventors: Peter Pinten, Cihogne Duetz; Hans Naubereit, Troisdorf-Oberlar; Werner Trautvetter, Spich, all of Germany

[73] Assignee: Dynamit Nobel AG, Troisdorf near Cologne, Germany

[22] Filed: May 9, 1972

[21] Appl. No.: 251,756

Related U.S. Application Data

[60] Division of Ser. No. 871,665, Nov. 3, 1969, abandoned, which is a continuation of Ser. No. 797,326, Jan. 10, 1969, abandoned, which is a continuation of Ser. No. 340,783, Jan. 28, 1964, abandoned.

[30] Foreign Application Priority Data

Jan. 31, 1963 Germany.................................. 40801

[52] U.S. Cl............................................. 260/878 R
[51] Int. Cl. ............................................ C08F 15/00
[58] Field of Search .................................. 260/878 R

[56] References Cited
UNITED STATES PATENTS

| | | | |
|---|---|---|---|
| 2,733,228 | 1/1956 | Salyer et al. ..................... | 260/878 R |
| 3,358,054 | 12/1967 | Hardt et al....................... | 260/878 R |
| 3,517,083 | 6/1970 | Salyer ............................. | 260/878 R |

FOREIGN PATENTS OR APPLICATIONS

621,868   6/1961   Italy ............................... 260/878 R

*Primary Examiner*—Joseph L. Schofer
*Assistant Examiner*—A. Holler
*Attorney, Agent, or Firm*—Burgess, Dinklage & Sprung

[57] ABSTRACT

Polyvinylchloride polymers having a high impact strength are produced by dissolving in vinyl chloride, polymer of ethylene and vinyl acetate or polymer of ethylene and acrylic acid esters, and polymerizing the vinyl chloride-polymer mixture.

7 Claims, No Drawings

POLYVINYL CHLORIDE TYPE RESINS

This application is a division of Ser. No. 871,665, filed Nov. 3, 1969, abandoned upon filing of this application, which is a continuation of Ser. No. 797,326, filed Jan. 10, 1969, now abandoned, which is a continuation of Ser. No. 340,783, filed Jan. 28, 1964, now abandoned.

For certain purposes, objects made of polyvinyl chloride are excessively sensitive to impact and numerous attempts have already been made to eliminate this shortcoming. Rubber-like butadiene-containing mixed polymerisates and chlorinated polyethylene have been used as additives to remedy the difficulty. Such materials, however, result in an impairment of the stability to light and in resistance to aging. Other compounds are infeasible because of their high cost. Improvement is provided by using polymers of ethylene and vinyl acetate or of ethylene and acrylic acid esters, such as are known commercially under the name "LEVAPREN" or "ELVAX." However, they are available only in the form of coarse pieces, and it is therefore not possible to work them into the PVC-powder except in small doses, intermittently, on rollers. A large scale technical production is impossible.

The present invention is characterized by the fact that the ethylene polymers are dissolved in the monomer vinyl chloride and, thereafter, the polymerization is carried out in the manner usual for vinyl chloride polymerization. The distribution of the ethylene polymers is homogenous to an extent not obtainable by any mechanical process. The high impact resistance of the polyvinyl chloride produced in this manner is thus evenly distributed over the entire volume of the molded bodies made therefrom.

Surprisingly, it was found upon closer examination that the polymer product is not simply a mixture of polyvinyl chloride and ethylene polymer, but that at least part of the ethylene polymer has polymerized or entered itno a graft copolymerization with the vinyl chloride; and that the increased impact resistant effect can no longer be attributed to the presence of the ethylene polymer, but rather to the above-mentioned graft copolymerization or the like. If such polymer product is extracted with carbon tetrachloride, which easily dissolves the ethylene polymers, it is found that the polymer product dissolves only a small amount of ethylene polymer. In contrast to this, when a mechanical mixture is produced on hot rollers, the ethylene polymer can again be completely extracted, as is illustrated in the table below:

| Mixed Polymerisate Consisting of Ethylene and Vinyl Acetate | Extract with Carbon Tetrachloride |
|---|---|
| 10% rolled into PVC | 11.4% with Cl content of 2.8% |
| 8.5% polymerized into VC | 3.2%, with Cl content of 19.0% |

Monomer other than vinyl chloride can be used along with the vinyl chloride monomer. Thus about 5–20% of the vinyl chloride can be replaced by vinyl acetate, acrylic acid esters or maleic acid esters.

Generally, good results are obtained when using approximately 5% – 15% of the ethylene polymer. This amount may be increased to approximately 40% for very soft products. As to the ethylene polymer, the ester moiety (vinyl acetate or acrylic acid ester) preferably is about 25% – 50% of the ethylene polymer. The rubber elasticity, and thereby also the beneficial effect upon the impact resistance of the polyvinyl chloride, increase with higher percentages of ester moiety, e.g. at 35% – 50%.

Thus, the invention provides, in the product of resins of the polyvinyl chloride class (by which is meant resins having properties of polyvinyl chloride resins), the improvement which comprises dissolving a polymer of ethylene and vinyl acetate or a polymer of ethylene and acrylic acid esters in vinyl chloride and polymerizing the vinyl chloride.

A good criterion for measuring the quality of the impact resistance is obtained by the U-impact resistance factor, determined by DIN — Rule 53 453. DIN signifies Germany Industry Standards. In the examples cited below rods of 4 mm thickness were used for testing purposes.

EXAMPLE 1.

10 parts of ethylene polymer consisting of 70 parts of ethylene and 30 parts of vinyl acetate are agitated while being dissolved under pressure in 90 parts of vinyl chloride. Double amount of water, in which 2% gelatine has been dissolved, is then added and polymerization is carried out for approximately 12 hours at a temperature of approximately 50°C., after 0.1% benzol peroxide has been added. The resulting powdery polymer product is then sucked off, washed with water and finally dried. As is customary when using pure polyvinyl chloride, calenders, extruders and presses are used for the finishing process, i.e. the fabrication of plates, pipes and other molded bodies. The U-Impact-Resistance of 4 mm rods amounted, at 20°C., to 39.2 cmkp/cm$^2$, as compared with 2.5 cmkp/cm$^2$ in pure polyvinyl chloride.

EXAMPLE 2.

8 parts of an ethylene polymer, consisting of 55 parts of ethylene and 45 parts of vinyl acetate, are agitated while being dissolved in 276 parts of a mixture, consisting of 1 part of vinyl chloride and 3 parts of water, and then polymerized to a powdery product, as described in Example 1. Rods made of this polymer product showed a U-Impact-Resistance of 45.2 cmkp/cm$^2$ and pipes made of the same did not splinter when exposed to great impact stress.

EXAMPLE 3.

7 parts of a mixed polymer, composed of 60 parts of ethylene and 40 parts of acrylic acid ethyl ester, were dissolved in 93 parts of vinyl chloride and then polymerized, as described in Example 1. The molded bodies made of this polymer product withstood hammer blows while similar pipes made of pure polyvinyl chloride splintered under such treatment.

As compared with mechanical mixtures of polyvinyl chloride and ethylene polymers, the polymer product offers not only the advantages of smiplified and less expensive processing, but also of an extraordinarily even distribution of the ethylene polymer. As a result, satisfactory and uniform firmness is obtained even when a relatively small amount of additive is used. The chemical stability is also greater in comparison with the products containing aromatic and chlorinated hydrocarbons.

Percentages herein are weight percent unless otherwise indicated.

What is claimed is:

1. In the production of resins of the polyvinyl chloride class, the improvement which comprises dissolving polymer of ethylene and acrylic acid ester in a medium consisting essentially of vinyl chloride and polymerizing vinyl chloride, the ester moiety in said polymer being about 35–50% by weight of the polymer, and said polymer dissolved in said medium being about 5–40% by weight of the polymer-vinyl chloride mixture.

2. In the production of resins of the polyvinyl chloride class, the improvement which comprises dissolving polymer of ethylene and acrylic acid ester in a mixture of vinyl chloride and monomer selected from the group consisting of vinyl acetate, acrylic acid esters and maleic acid esters, the proportion of said monomer in said mixture being about 5–20% by weight of the mixture, the ester moiety in said polymer being about 35–50% by weight thereof, said polymer being about 5–40% by weight of the combined weight of polymer and the mixture of vinyl chloride and monomer.

3. Process according to claim 1, wherein said polymer is about 5–15% by weight of the polymer-vinyl chloride mixture.

4. Process according to claim 2, wherein said polymer is about 5–15% by weight of the combined weight of polymer and the mixture of vinyl chloride and monomer.

5. In the production of resins of the polyvinyl chloride class, the improvement which comprises dissolving polymer of ethylene and acrylic acid ester in vinyl chloride and polymerizing the vinyl chloride.

6. In the production of resins of the polyvinyl chloride class, the improvement which comprises dissolving polymer of ethylene and acrylic acid ester in a mixture of vinyl chloride and monomer selected from the group consisting of vinyl acetate, acrylic acid esters, and maleic acid esters, the proportion of said monomer in said mixture being about 5–20% by weight of said mixture, and polymerizing the monomer and vinyl chloride.

7. Process according to claim 1, wherein said polymer is a polymer of ethylene and acrylic acid ethyl ester.

* * * * *

PO-1050
(5/69)

UNITED STATES PATENT OFFICE
CERTIFICATE OF CORRECTION

Patent No. 3,888,948                    Dated June 10, 1975

Inventor(s) Peter Pinten, Hans Naubereit, and Werner Trautvetter

It is certified that error appears in the above-identified patent and that said Letters Patent are hereby corrected as shown below:

Summary page, [75], change "Cihogne" to --Cologne--.

Column 3, line 8, before "vinyl" insert --the--.

Signed and Sealed this fourteenth Day of October 1975

[SEAL]

Attest:

RUTH C. MASON
Attesting Officer

C. MARSHALL DANN
Commissioner of Patents and Trademarks